(12) United States Patent
Seaba et al.

(10) Patent No.: US 7,722,831 B2
(45) Date of Patent: May 25, 2010

(54) MICRO COMPONENT STEAM REFORMER APPARATUS FOR PRODUCING A SYN-GAS FROM LIQUID HYDROCARBONS

(76) Inventors: James Seaba, 9300 Farragut Dr. NE., Albuquerque, NM (US) 87111; Christopher J. Brooks, 8206 Shannon Glen Blvd., Dublin, OH (US) 43016

( * ) Notice: Subject to any disclaimer, the term of this patent is extended or adjusted under 35 U.S.C. 154(b) by 228 days.

(21) Appl. No.: 11/534,797

(22) Filed: Sep. 25, 2006

(65) Prior Publication Data
US 2008/0209808 A1 Sep. 4, 2008

Related U.S. Application Data

(63) Continuation of application No. 10/689,246, filed on Oct. 20, 2003, now abandoned, which is a continuation of application No. 09/803,592, filed on Mar. 9, 2001, now abandoned, and a continuation-in-part of application No. 09/847,727, filed on May 2, 2001, now Pat. No. 6,716,400.

(51) Int. Cl.
*B01J 8/04* (2006.01)

(52) U.S. Cl. .................. 422/188; 422/198; 422/189; 422/190; 422/200; 422/211; 422/222; 422/191; 422/193; 48/61; 48/127.9; 429/19; 429/20; 429/17; 165/166; 165/164; 165/165; 423/648.1; 423/652

(58) Field of Classification Search .................. 422/198
See application file for complete search history.

(56) References Cited

U.S. PATENT DOCUMENTS

| | | | |
|---|---|---|---|
| 3,996,128 A * | 12/1976 | Espenscheid et al. | ......... 208/89 |
| 6,143,943 A * | 11/2000 | Oroskar et al. | ............. 585/654 |
| 6,277,339 B1 * | 8/2001 | Boneberg et al. | ........... 422/198 |
| 6,294,149 B1 * | 9/2001 | Autenrieth et al. | ....... 423/648.1 |
| 6,491,985 B2 * | 12/2002 | He | ............................. 427/450 |
| 6,716,400 B2 * | 4/2004 | Brooks et al. | ............... 422/198 |
| 6,805,553 B2 * | 10/2004 | Hermann et al. | ........... 431/328 |
| 7,125,540 B1 * | 10/2006 | Wegeng et al. | ............. 423/650 |
| 2001/0014301 A1 * | 8/2001 | Nakamura et al. | ......... 422/198 |
| 2001/0024629 A1 * | 9/2001 | Brauchle et al. | ............ 422/198 |

* cited by examiner

*Primary Examiner*—Alexa D. Neckel
*Assistant Examiner*—Kaity V. Handal
(74) *Attorney, Agent, or Firm*—Mark E. Duell; Porter Wright Morris & Arthur, LLP (57) ABSTRACT

A micro component steam reformer system for producing hydrogen-enriched gas to power a fuel cell adapted for scalable power requirements wherein fluid flow is configured in a circuit whereby, in serially interconnected fluid flow modules, a vaporized hydrocarbon is mixed with fuel cell off gas having a hydrogen component and combusted to heat vaporizers and a steam reformer, vaporized hydrocarbons and water vapor are introduced as a feed stock into the steam reformer to produce a syn-gas, which is cooled and purified, and the resulting principally hydrogen gas is introduced into a hydrogen fuel cell having an interconnection within the circuit in which off gas from the fuel cell is processed to provide hydrogen and water for use in the system cycle.

12 Claims, 6 Drawing Sheets

MICRO COMPONENT STEAM REFORMER APPARATUS FOR PRODUCING A SYN-GAS FROM LIQUID HYDROCARBONS

CROSS-REFERENCE TO RELATED APPLICATIONS

This application is a continuation of our co-pending application Ser. No. 10/689,246 filed on Oct. 20, 2003, which in turn was a continuation of application Ser. No. 09/803,592 filed on Mar. 9, 2001, now abandoned, both titled Micro Component Liquid Hydrocarbon Reformer System and Cycle for Producing Hydrogen Gas, and a continuation in part of our application Ser. No. 09/847,727 filed on May 2, 2001 which issued as U.S. Pat. No. 6,716,400 on Apr. 6, 2004 titled Ignition System For a Fuel Cell Hydrogen Generator."

BACKGROUND OF THE INVENTION

The present invention relates to a micro component hydrocarbon steam reformer system for producing hydrogen gas and a reaction cycle useful in the system. Particularly, the system relates to micro component apparatus and cycles useful in powering fuel cells adapted for motor vehicle use and other discrete systems having incremental and/or scalable energy requirements.

Hydrogen fuel cells are non-polluting, highly efficient power sources. See, for example, various publications at the web site of the United States Department of Energy and Fuel Cells Green Power, Los Alamos National Laboratory, U.S. Department of Energy, 1999.

The use of fuel cells (despite their desirable characteristics) in motor vehicles, transportation, mobile and "small scale" applications (varying from powering a laptop computer to providing power for an entire home), where a discrete source of hydrogen is required, is hindered because a convenient, safe and/or mobile source of hydrogen having a size appropriate for the discrete use is not available.

It is an object of the invention to provide a hydrocarbon steam reformer system that produces a hydrogen-enriched gas, such as used to feed an electric power producing fuel cell. It is a further object to provide such a system in a configuration and using a cycle that is convenient, safe, and adaptable for small scale use and is incrementally scalable to adjust to predetermined power requirements.

Prior art convention in fuel cell technology, generally in automotive applications, employs an auto-thermal reforming system that, through a sequence of known chemical reactions, converts hydrocarbons, water and air into hydrogen-enriched gas that feeds a fuel cell. Steam reformer systems are known; but the art is skeptical of the adaptability of steam reformer systems for motor vehicle use. See "Fuel Cell Technology," Automotive Engineer, September 2000, pages 78 et seq. In contrast, the system of the invention enables the use of a steam reforming process for automotive and other predetermined power requirement applications, achieves improved operating efficiencies, and is adapted to scalable operation and expansion in discrete modular assemblies. The invention offers the advantages of small size and is volumetrically scalable with respect to flow rates as determined by power requirements for a specific situation.

SUMMARY OF THE INVENTION

In the preferred embodiment of the invention, an energy balanced reaction cycle converts gasoline, a liquid mixture of hydrocarbon compositions ($C_xH_y$) having properties approximated by an iso-octane ($C_8H_{18}$) model, and water ($H_2O$), into a hydrogen ($H_2$) enriched syn-gas fuel for powering a fuel cell. An external heat source initiates the cycle and the steam reformer cycle of the system is fed and partly fueled by a source of hydrocarbons. The greater efficiency of the system and the increased concentration of $H_2$ in the syn-gas produced by the invention contrasts with auto-thermal systems. Auto-thermal systems convert gasoline, water and air into hydrogen ($H_2$) enriched syn-gas. The addition of air lowers system efficiency and generally produces an $H_2$ concentration with a mole fraction in the range of about 0.3 to about 0.4 with a high concentration of nitrogen, a mole fraction of about 0.45, requiring a high flow rate, less contact time in reaction chambers and larger reactor size.

The steam reforming cycle and system of the invention produces $H_2$ concentrations in the mole fraction range of about 0.65 to about 0.75. Using a steam reformer, the cycle feeds a stream of gasoline (or other suitable hydrocarbon) through a series of catalytic reactors and heat exchangers to produce a hydrogen ($H_2$) enriched syn-gas to power a fuel cell in the system cycle. External energy to drive the steam reforming process and to effect the vaporization of liquids introduced into the system is produced by fuel cell off gas and gasoline mixed with ambient air. The external energy generates heat to drive the steam reforming and vaporization processes in novel micro component reactor and heat exchanger modules and devices.

Hydrogen is stored in a minor quantity by a suitable method, and introduced from storage to a starter module that includes a vaporizer which initiates the cycle. The cycle thereafter operates from a combination of the fuel cell off gas and gasoline, producing syn-gas useful for powering a fuel cell. The system does not require a continuous injection of hydrogen from an external source.

The invention is described more fully in the following description of the preferred embodiment considered in view of the drawings in which:

DETAILED DESCRIPTION OF THE INVENTION AND THE PREFERRED EMBODIMENT

Generally described, the system and cycle of the invention is a steam reformer system for producing hydrogen enriched gas from liquid or vaporized hydrocarbons. In an embodiment, gasoline is steam reformed in a cycle to produce $H_2$, preferably to power a fuel cell. In the cycle, the off gas of the fuel cell is utilized as a source of heat energy to power the cycle. A vaporized hydrocarbon is mixed with fuel cell off gas having a hydrogen component and combusted to heat the steam reformer. Vaporized hydrocarbons and water vapor are introduced into the steam reformer to produce a syn-gas primarily comprising $H_2$, $CO_2$, CO, $H_2O$, and $CH_4$. The gas is cooled. CO is removed. The resulting principally hydrogen gas is introduced into the hydrogen fuel cell.

Water and gasoline are vaporized then mixed; the mixture is processed and ultimately directed to a high temperature steam reformer and then to a water gas shift reactor where hydrogen gas is produced in known reactions approximated by the equations: $C_8H_{18}+12H_2O \rightarrow 4CO_2+4CO_2+21H_2$ and $CO+H_2O \rightarrow CO_2+H_2$.

The resulting $H_2$ rich syn-gas is then preferentially oxidized in a reactor prior to introduction into the fuel cell. The fuel cell will utilize about 60% to about 90% of the $H_2$ in the syn-gas mixture. The remaining unutilized $H_2$ exits the fuel cell and is mixed with hydrocarbons (gasoline) to supply energy to drive the heat exchange, vaporization, steam reformer and water gas shift processors and reactors in the system.

The cycle is started using hydrogen from the fuel cell off gas that is stored in a suitable vessel interconnected with the system. The cycle operates independently after start-up. A suitable starting device is described in our U.S. Pat. No. 6,716,400 "Ignition System for a Fuel Cell Hydrogen Generator" issued on Apr. 6, 2004 from application Ser. No. 09/847,727, filed on May 2, 2001. The starting device is a module that includes a vaporizer and a combustor initiated by the stored fuel cell off gas hydrogen. Once initiated and operating, the heat energy source for the system comprises vaporized hydrocarbons and fuel cell off gas that provide the energy to drive the system. The off gas/hydrocarbon mixture is catalytically combusted in the system in micro component vaporizer and steam reformer devices that are serially interconnected in conformance with the processing sequences described herein. After the steam reformer processing, $H_2$ is produced in a gas mixture which is then treated in a water gas shift reactor and preferentially oxidized before the gas is introduced into the fuel cell to remove CO that may otherwise poison the fuel cell.

Figure 1:
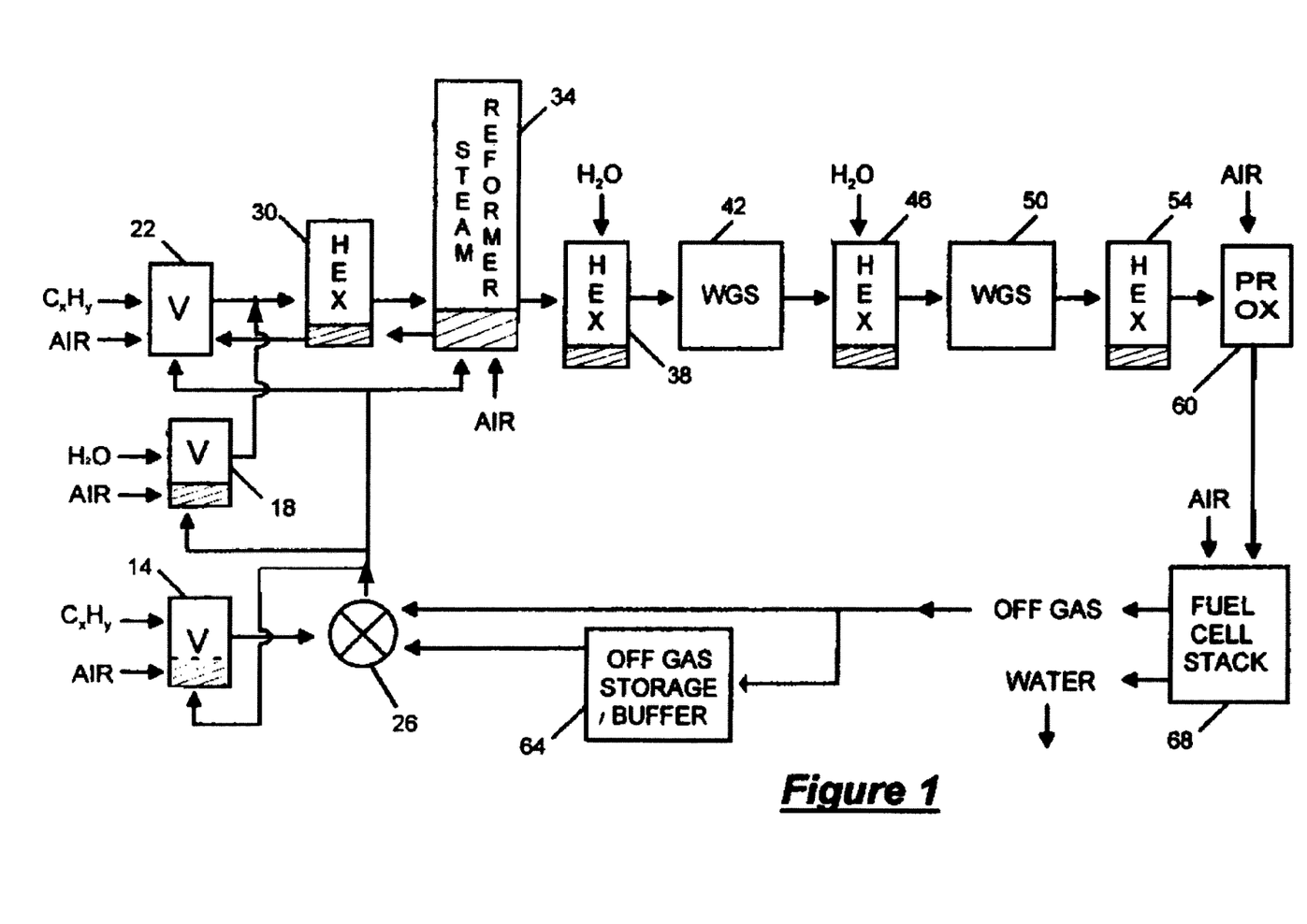
FIG. 1 is a schematic diagram of the system and cycle.
Figure 1A:
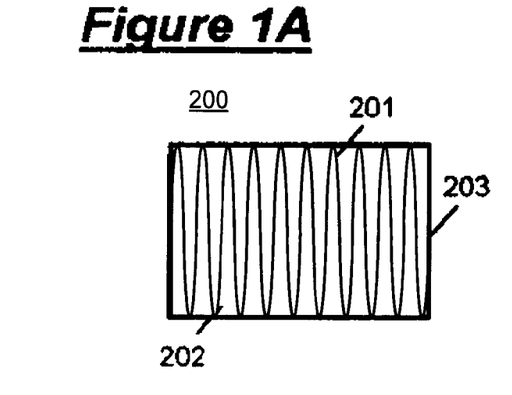
FIG. 1A, FIG. 1B, FIG. 1C, and FIG. 1D show characteristics of the vaporizer, heat exchanger, steam reformer and water/gas shift component devices used in a system.

An example of the system and cycle illustrated in FIG. 1 is described below:

EXAMPLE I

With reference to FIG. 1, a fuel processor for processing hydrocarbon fuel to produce hydrogen includes first and second fuel vaporizers 14 and 22, water vaporizer 18, mixer 26 for mixing vaporized fuel and fuel cell off gas, first heat exchanger 30, steam reformer 34, second heat exchanger 38, first water gas shift reactor 42, third heat exchanger 46, second water gas shift reactor 50, fourth heat exchanger 54, preferential oxidation reactor 60, storage tank 64 for storing fuel cell off gas, and fuel cell stack 68.

In the fuel processor, a hydrocarbon fuel, preferably a liquid fuel such as gasoline is vaporized by the first fuel vaporizer 14. (In an embodiment, energy for vaporizer 14 may be provided by the combustion of fuel cell off gas maintained in a buffer or other storage.) The vaporized fuel is mixed with stored fuel cell off gas, or hydrogen, from storage tank 64 in mixer 26 until the fuel processor is heated and running, at which point the vaporized liquid hydrocarbon fuel is mixed in mixer 26 with fuel cell off gas from the fuel cell stack 68. The mixture of fuel cell off gas and vaporized fuel from the mixer 26 is introduced into and primarily catalytically burned in the water vaporizer 18 to vaporize water, raising the temperature of the water from ambient temperature (approximately 25° C.) to approximately 350° C. The off gas/hydrocarbon mixture may also be introduced for catalytic burning in the second fuel vaporizer 22 and steam reformer 34. Temperatures provided throughout relate to specific experimental models and are variable dependent on component design, system catalyst and heat characteristics, overall tolerances, flow rates, and other design and reaction criteria.

In the second fuel vaporizer 22, hydrocarbon fuel for the steam reformer 34 is vaporized, raising the temperature of the feed stream from ambient (approximately 25° C.) to approximately 350° C. The vaporized fuel from the second fuel vaporizer 22 and the water vapor from the water vaporizer 18 are mixed and fed to the first heat exchanger 30. The mixture of fuel and water vapor is heated to approximately 700° C. and fed to the steam reformer 34. In the steam reformer 34, the fuel and water vapor undergo a catalyst induced reaction to produce syn-gas comprising $H_2$, $CO_2$, CO, $H_2O$, and $CH_4$. Heat generated in the steam reformer 34 is directed back to heat exchanger 30 and the second fuel vaporizer 22 with its associated combustor. Where heat transfer is from a higher to lower temperature, a recuperative heat exchanger module (i.e., without a catalyst) may be utilized.

The syn-gas leaves the steam reformer and passes through a second heat exchanger 38, where water is added to the syn-gas to cool the syn-gas to approximately 450° C. The syn-gas then passes through a first water gas shift reactor 42 to reduce the proportion of CO component gas from the syn-gas mixture. The syn-gas then passes through third heat exchanger 46, where water is added and the syn-gas cools to approximately 250° C. The syn-gas then passes through second water gas shift reactor 50 to further reduce the CO component from the syn-gas. In the water gas shift reactors, the catalyst induced reaction is $CO+H_2O \leftarrow \rightarrow H_2+CO_2$. After exiting the second water gas shift reactor 50, the gas passes through a fourth heat exchanger 54, which reduces the syn-gas temperature to approximately 100° C. Finally, the syn-gas is passed through the preferential oxidation reactor 60 and to the fuel cell bank 68. The off-gas from the fuel cell is then routed back to the mixer 26 and/or storage/buffer tank 64. Water produced in the fuel cell 68 may be cycled in the system, for example, to add water to the syn-gas at the second and third heat exchangers 38 and 46, or stored as a feed stock.

Zeolite crackers known in the art may be placed after the first and/or second fuel vaporizers 14 and 22 to break down a hydrocarbon fuel such as gasoline, into lighter hydrocarbons that may catalytically burn easier in heating the water vaporizer 18 and steam reformer 34.

Figure 1B:
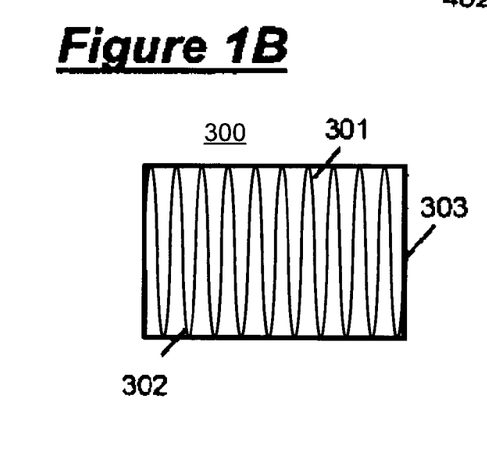

FIG. 1A, FIG. 1B, FIG. 1C and FIG. 1D show in cross-section characteristics of the system component vaporizers 14, 18 and 22, heat exchangers 30, 38, 46 and 54, steam reformer 34, and water gas shift reactors 42 and 50 used in the system. Using a vaporizer 200 as an example in FIG. 1A, separate laminar fluid flows are directed through adjacent volumes 201 and 202 in a micro component structure with a separator 203 forming adjacent channels for directing laminar fluid flow. In the vaporizer, the liquid water or hydrocarbon composition passes through one volume 201 of the component assembly to be vaporized as the result of heat exchanged by conduction with the fluid flow of heated gas in the adjacent volume 202 of the component assembly. FIG. 2 illustrates the vaporizers 22 and 30 respectively associated with combustors 21 and 29, as otherwise shown in FIG. 3C.

Heat exchangers for the system are similarly structured micro component devices. Heat exchanger 300 shown in FIG. 1B provides separate laminar fluid flow channels directed through adjacent volumes 301 and 302 on opposite sides of a separator 303 in the device in which heat energy between the two adjacent channels may be exchanged primarily by conduction or diffusion, depending on whether the respective fluids are in a vaporized liquid or gas state.

Figure 1C:
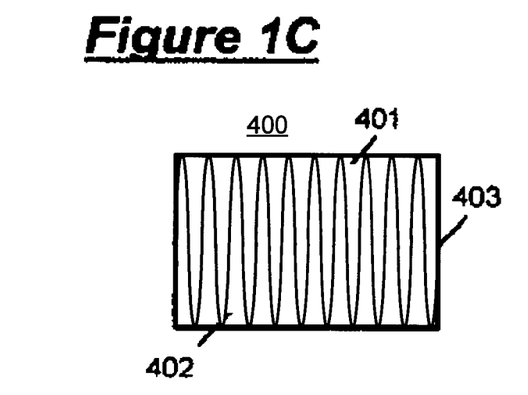
Figure 2:
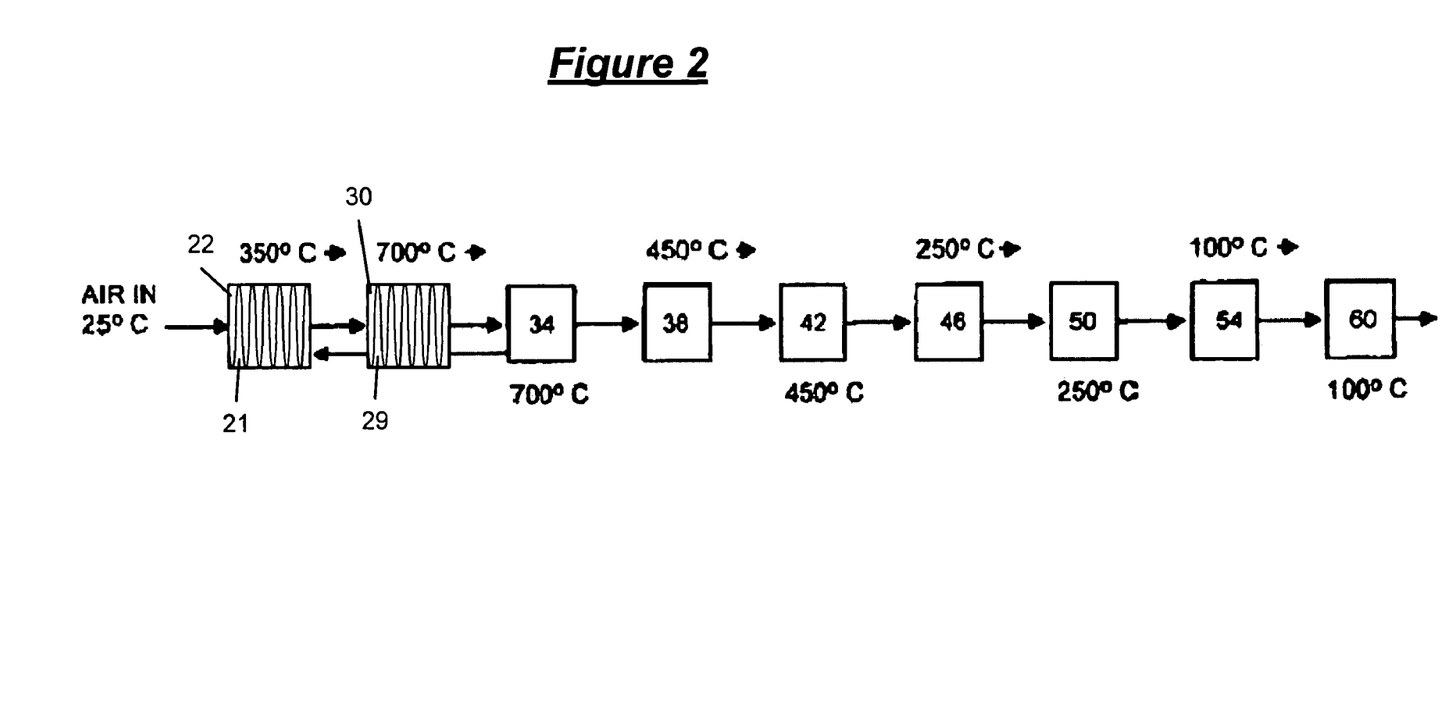
FIG. 2 depicts representative process temperatures in the cycle in the designated modules correlated with like modules identified in FIG. 1.

Likewise steam reformer 34 shown as 400 in FIG. 1C, provides separate laminar fluid flow channels directed through adjacent volumes, optimally, a catalytic reaction chamber 401, and a fluid flow heat source 402 on opposite sides of a separator 403 in the device in which heat is exchanged primarily by diffusion and conduction between gas flows on opposite sides of the separator.

Figure 1D:
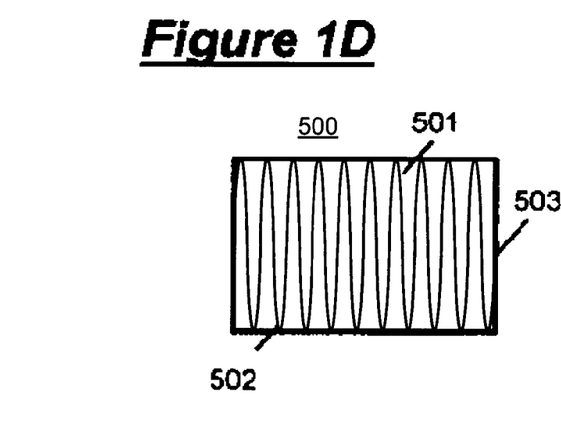

The water/gas shift reactors 42 and 50 are similarly structured devices with separated channels for directing fluid flow in the channels defined by the separators on their opposite sides as shown in the reactor 500 of FIG. 1D having separated channels 501 and 502 formed by channel separator 503.

In the modules in which a reaction occurs, the side of the separator component on which a reaction occurs is optimally coated with an appropriate catalyst to induce the appropriate process reaction within the module on that side of the separator.

Figure 3A:
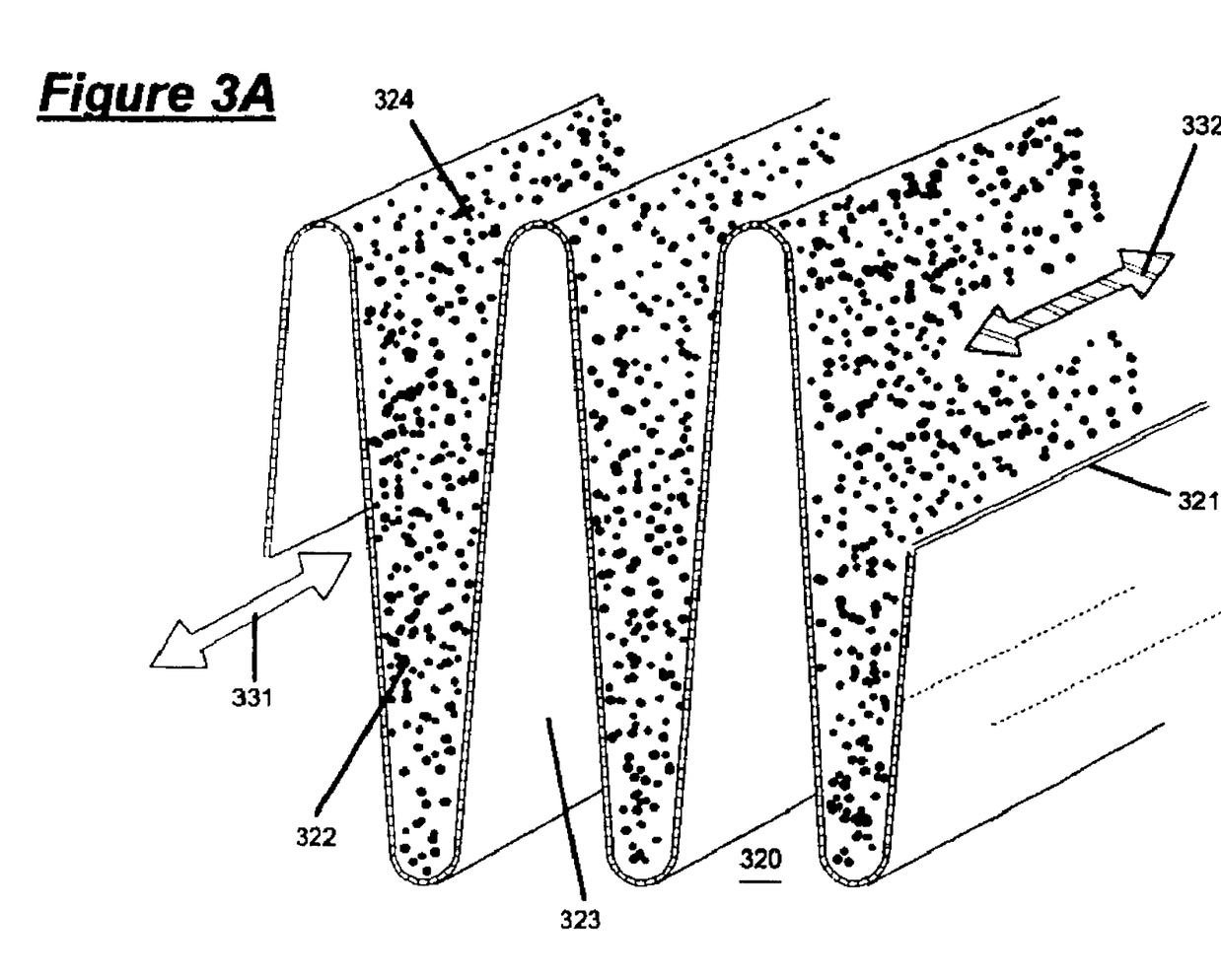
FIG. 3A represents in an enlarged perspective detail, a view of channels that direct laminar fluid flow in micro component assembly devices used in the system.

FIG. 3A illustrates in enlarged detail a section of a wavyplate separator in a micro component assembly used in the system, and the relationship of the separator to fluid flows on its opposite sides. The separate fluid flows on the opposite sides of the wavyplate may be in the same or in opposite directions. In FIG. 3A, a shaped or folded wavyplate 320 has two opposite sides 321 and 322 (322 is shown coated with a catalyst material 324), respectively exposed to laminar fluid flows 331 and 332 in a heat exchanger assembly. Such types of devices used in the system are described in U.S. application for patent Ser. No. 09/627,267, filed Jul. 28, 2000 for "Multi-purpose Micro Channel Micro Component" owned by the assignee of the present application, a division of which issued as U.S. Pat. No. 6,946,113 on Sep. 20, 2005 titled Method for Processing Fluid Flows in a Micro Component Reformer System.

Figure 3B:
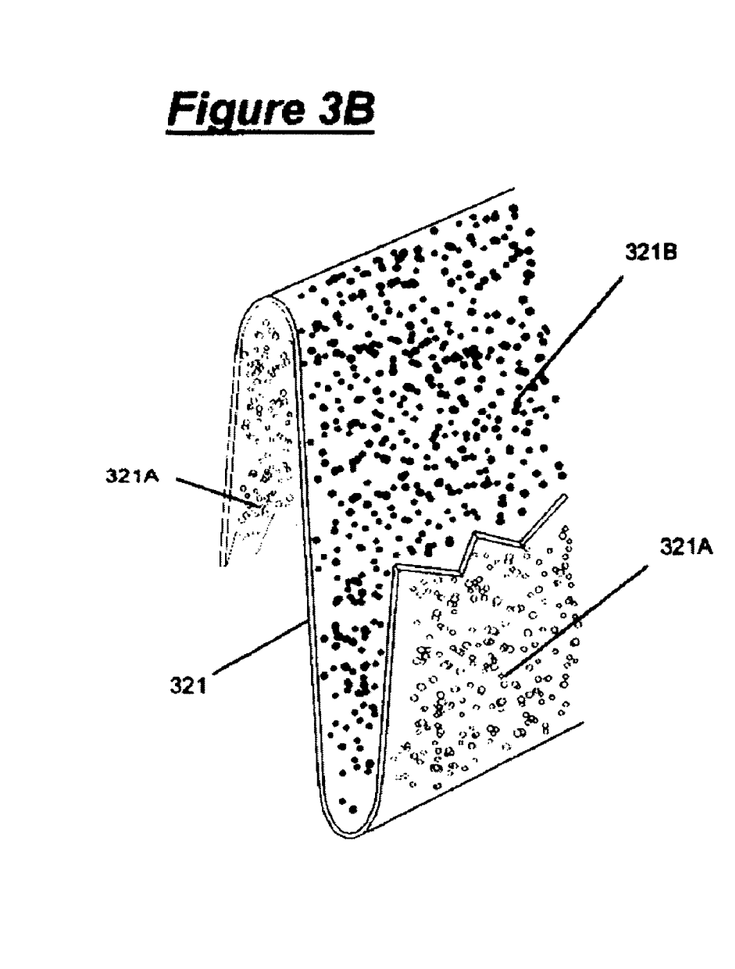
FIG. 3B represents a section of wavyplate separator useful in a laminar flow micro component module having different catalyst compositions on opposite sides to promote the different reactions occurring in the fluid flows on either side of the separator.

In one embodiment as a steam reformer chamber shown in FIG. 3B, the one side of the wavyplate 321 is formed with a coating of a metal oxide catalyst material 321A to promote the steam reforming reaction in fluid flow on that side of the separator plate. Maintenance of the steam reforming reaction requires that heat be input into the exchanger. The sustained 700° C. heat for the steam reforming reaction is provided by a further catalytically induced exothermic reaction, in the fluid flow on the opposite side of the separator, of a mixture of combustible materials, such as fuel cell off gas containing hydrogen, and/or gasoline, and air on the opposite side of the separator plate which is coated with a catalyst 321B. In an example, center points of the sections (top to top) of the wavyplate are approximately 3.0 millimeters apart. The preferred steam reformer is a micro component assembly having a high heat flux in which separate sections of a heat exchanger are divided by a thin plate having an oxidation catalyst on one side (exothermic, to provide heat) and a steam reforming catalyst (endothermic) on the other, in which heat transfer occurs by conduction. Fluid flow on opposite sides of the separator may be in the same (co-flow) or opposite (counter-flow) directions.

In the various modules used in the system, the separator should be as thin and rigid as possible, in the order of magnitude of approximately 100 microns to approximately 1000 microns as a maximum. Inconel®, a family of trademarked nickel-chromium-iron alloys, is a useful material. Design parameters depend on accommodating thinness with separator rigidity and heat transfer characteristics, i.e., $\Delta T°$/Thickness. In the operation of the cycle, heat transfer between fluids is optimally balanced depending on the flow rate of the fluid passing in the steam reformer, the rate of steam reforming, the catalysts on both sides, the capability of the oxidation catalyst and the flow rate on the oxidation side. Heat utilization an/or catalyst characteristics on the steam reforming side are design factors.

Figure 3C:
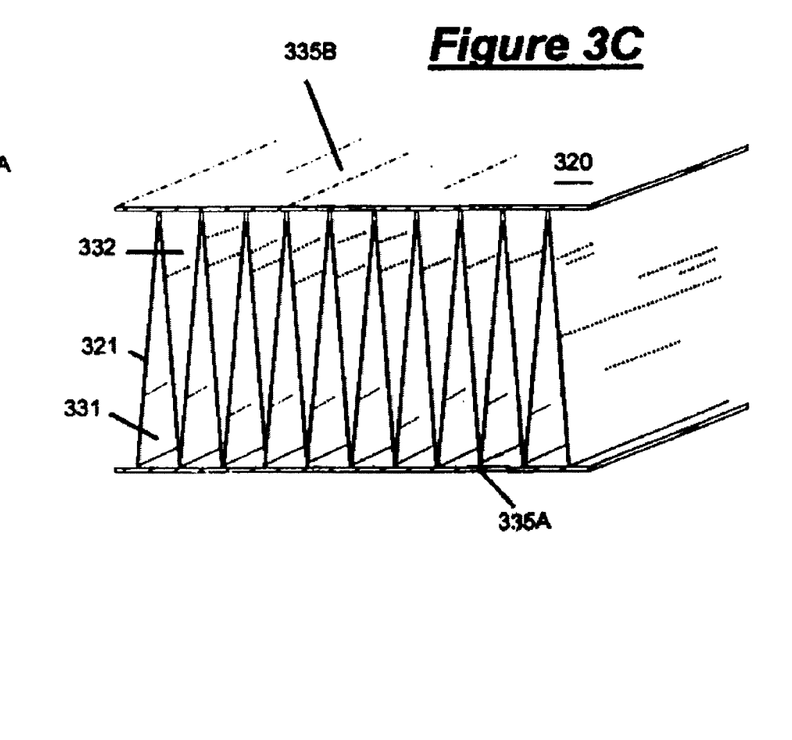
FIG. 3C is a detail of a perspective and cross sectional view of a section of a laminar flow micro component module showing channels on opposite sides of a separator plate for directing fluid flow.

FIG. 3C shows a section of a micro component module 320 with a wavyplate separator 321 forming channels for laminar flow, 331 and 332, on both sides of a separator in an enclosure having lower and upper sides 335A and 335B. For clarity, the right and left sides and inlet and outlet orifices for flow in the channels of the module are not shown. As noted above, micro component assemblies useful to be adapted to vaporizer, heat exchanger, steam reformer and water/gas shift devices for the system are described in U.S. Pat. No. 6,946,113.

With reference to the various system modules shown in FIG. 1, the following Table I relates the modules to reference numerals in the drawings, functions and reactions accomplished, and the approximate preferred (design optimum) temperatures related to the fluid processing accomplished therein:

TABLE I

| Module Reference No. | Function | Reaction | Temperature ° C. |
| --- | --- | --- | --- |
| 14 | Vaporizer | Hydrocarbon (gasoline) fuel is vaporized. | 25° in/350° out |
| 18 | Vaporizer | Liquid water is vaporized. | In: 25° Out: 500° +/− 200° |
| 22 | Vaporizer | Hydrocarbon (gasoline) fuel is vaporized. | In: 25° Out: 500° +/− 200° |
| 30 | Heat Exchanger | The temperature of the hydrocarbon/water vapor mixture is increased. | In: 500° +/− 200° Out: 800° +/− 200° |

TABLE I-continued

| Module Reference No. | Function | Reaction | Temperature ° C. |
|---|---|---|---|
| 34 | Steam Reformer | Catalyst induced reaction to produce syn-gas: $H_2$, $CO_2$, CO, $H_2O$, and $CH_4$. | 800° +/− 200° |
| 38 | Heat Exchanger | | In: 800° +/− 200°<br>Out: 350° |
| 42 | Water/Gas Shift Reactor | CO is removed from the syn-gas.<br>$CO + H_2O \leftrightarrow H_2 + CO_2$ | 350° |
| 46 | Heat Exchanger | | In: 350° (approximate)<br>Out: 200° (approximate) |
| 50 | Water/Gas Shift Reactor | CO in syn-gas is optimally reduced to 10 ppm.<br>$CO + H_2O \leftrightarrow H_2 + CO_2$ | 200° |
| 54 | Heat Exchanger | | 100° (approximate) |
| 60 | Preferential Oxidizer | | 100° (approximate) |

Although current optimal temperatures and ranges determined by testing and simulation are provided, optimal temperatures and ranges depend on interrelationships among components, laminar flow characteristics, and system design parameters. Modules 38 and 46 are principally water vaporizers where heat is provided on one side of the module to vaporize water (vapor) flowing on the other side, and depending on design factors otherwise, may not require an exothermic catalyst on the side opposite the water/vapor flow.

In a similar manner, Table II, considered in conjunction with FIG. 1, relates the micro component modules to the properties of the opposite sides of the separators in the devices with regard to the functions and/or reactions in the fluid flow passing on opposite sides and the catalyst properties of the respective separator sides. Useful catalysts identified with respect to the example include platinum, palladium, cerium oxide, aluminum hydroxide and cuprous oxide; other suitable catalysts may be substituted for the functions specified. In steady state simulations, catalyst composition for the steam reformer and water gas shift reactors are not factors.

TABLE II

| Module Reference No. and Function | Separator Properties | |
|---|---|---|
| | Flow Side One | Flow Side Two |
| 14 Vaporizer | Hydrocarbon (gasoline) fuel is vaporized.<br>Catalyst: None<br>Reference No. 14 (in) | 25° in/350° out<br>Catalyst:: Pd, Pt<br>Reference No. 14 (out) |
| 18 Vaporizer | Liquid water is vaporized.<br>Catalyst: None<br>Reference No. 18 (in) | 25° in/350° out<br>Combustor for HC and $H_2$<br>Catalyst:: Pd, Pt<br>Reference No. 18 (out) |
| 22 Vaporizer | Hydrocarbon (gasoline) fuel is vaporized.<br>Catalyst: None<br>Reference No. 22 (in) | 25° in/350° out<br>Combustor for HC and $H_2$<br>Catalyst:: Pd, Pt<br>Reference No. 22 (out) |
| 30 Heat Exchanger | The temperature of the hydrocarbon/water vapor mixture is increased.<br>Catalyst: None<br>Reference No. 30 (in) | 350° in/700° out<br>Catalyst:: Pd, Pt<br>Reference No. 30 (out) |

TABLE II-continued

| Module Reference No. and Function | Separator Properties | |
|---|---|---|
| | Flow Side One | Flow Side Two |
| 34 Steam Reformer | Oxidation side:<br>Catalyst induced reaction to produce syn-gas: $H_2$, $CO_2$, CO, $H_2O$, and $CH_4$.<br>Catalyst: Pd, Pt<br>Reference No. 34 (in) | Steam Reformer side: 700°<br>Combustor for HC and $H_2$<br>Catalyst: Pd, Pt/CeO/$Al_2O_3$<br>Reference No. 34 (out) |
| 38 Heat Exchanger | Catalyst: Pt/Pd<br>Reference No. 38 (in) | 700° in/450° out<br>Catalyst: None<br>Reference No. 38 (out) |
| 42 Water/Gas Shift Reactor | CO is removed from the syn-gas.<br>$CO + H_2O \leftrightarrow H_2 + CO_2$<br>Catalyst: Pt, CeO<br>Reference No. 42 (in) | 450°<br>Heat exchange.<br>Catalyst: None<br>Reference No. 42 (out) |
| 46 Heat Exchanger | Catalyst: Pt, Pd<br>Reference No. 46 (in) | 350° in/250° out<br>Catalyst: None<br>Reference No. 46 (out) |
| 50 Water/Gas Shift Reactor | CO in syn-gas is optimally reduced to 10 ppm.<br>$CO + H_2O \leftrightarrow H_2 + CO_2$<br>Catalyst: CuO<br>Reference No. 50 (in) | 250°<br>Heat Exchange.<br>Catalyst: None<br>Reference No. 50 (out) |
| 54 Heat Exchanger | Catalyst: None<br>Reference No. 54 (in) | 100°<br>Catalyst: None<br>Reference No. 54 (out) |
| 60 Preferential Oxidizer | Catalyst: Pt, Pd<br>Reference No. 60 (in) | 100°<br>Catalyst: None<br>Reference No. 60 (out) |

EXAMPLE II

Figure 4:
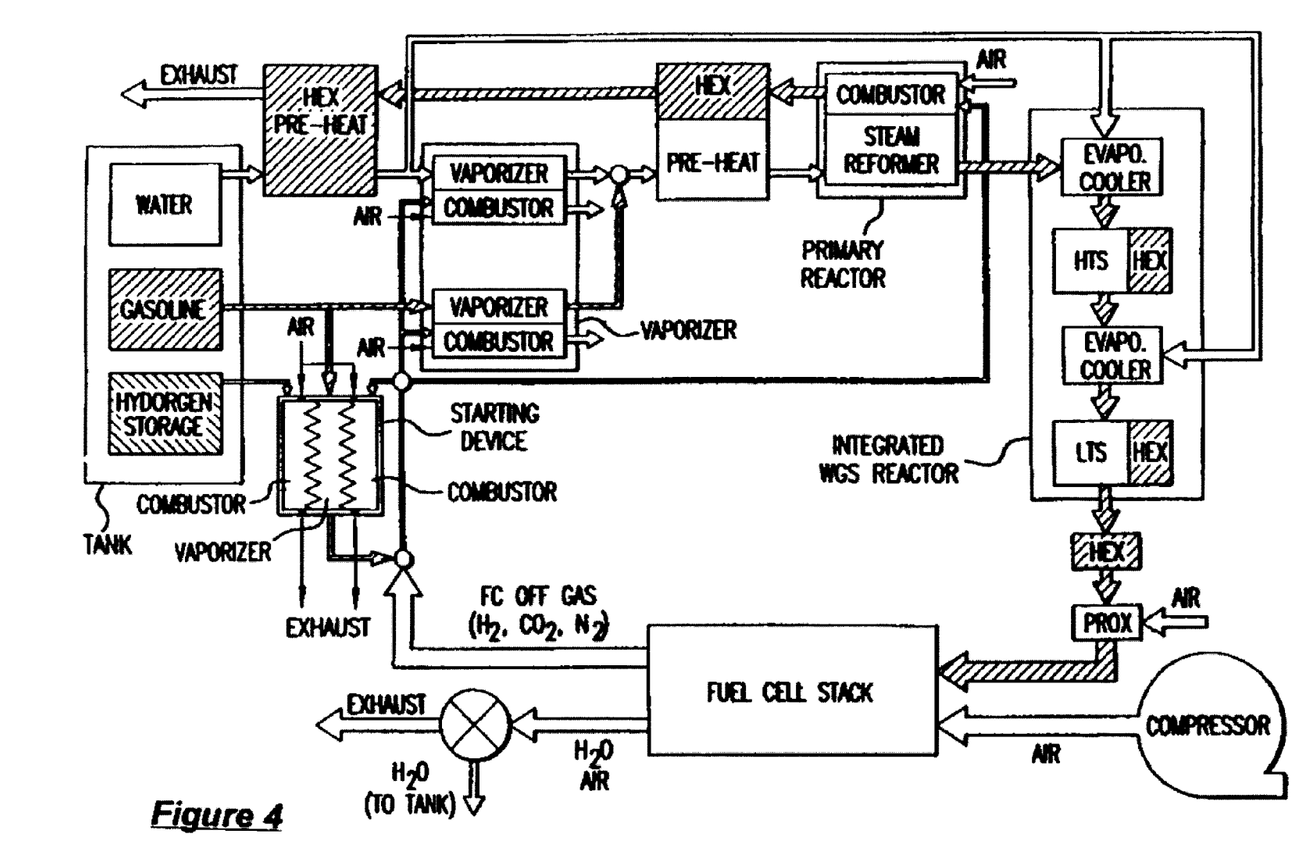
FIG. 4 is a representation of an embodiment of the invention utilizing a start module, also showing fluid flow and principal components in the system used with a hydrogen fuel cell.

A second example is shown in FIG. 4. In operation, the process is self-sustaining from fuel sources of hydrocarbons and water. A balanced isothermal reactor is provided that converts gasoline and water into hydrogen enriched gas that powers the fuel cell bank. The gasoline vapor supplies all combustors used for heating in the system; gasoline is both a fuel (as a source of heat for the combustors) and the raw material used in the production of hydrogen enriched gas. In the combustors, heat is generated from gasoline by means of a catalytic combustion reaction induced by a catalyst. Heat is transferred to the fluid on the opposite side of the separator as explained above. Stored hydrogen is used only when the system is started to initiate combustion in the first vaporizer.

FIG. 4 shows the system in conjunction with a starting device and a fuel tank and also illustrates the relationships of the micro component modules and their sections as involved in fluid flow in the system. In FIG. 4, an external fuel bank includes separate storage tanks for the storage of predetermined quantities of water ($H_2O$), gasoline (or other hydrocarbon fuel) and fuel cell off gas (or hydrogen ($H_2$)) used in the system. A start module includes sections respectively indicated as combustor, vaporizer and combustor assembled in a common module. As noted, the start-up device is described in our application to be filed. In starting the processor, hydrogen mixed with air is introduced into combustor and generates sufficient heat to vaporize gasoline and produce hydrocarbon vapor that is mixed with hydrogen to supply heat energy to combustor. Once fluid flow and reactions balance in the system, the flow of stored hydrogen is terminated and vaporizer and combustor in the system perform in the continuous reaction cycle equivalently to vaporizer 14 shown in FIG. 1.

Table III describes properties of the combustor, vaporizer and combustor sections of the starting device shown in FIG. 4. The starting device may be configured as a "sandwich" of units having the characteristics of the assembly shown in FIG. 3C.

TABLE III

| Module Function | Module Section Properties | | |
|---|---|---|---|
| | Combustor | Vaporizer | Combustor |
| Combustor/ Vaporizer/ Combustor | Hydrogen is mixed with air and burned. Catalyst: Pd | Gasoline is vaporized. Catalyst: None | Vaporized gasoline is mixed with fuel cell off gas, combusted and heat energy is directed to the vaporizer section. Catalyst: Pt/Pd |

Gasoline is the preferred fuel in the invention, because of its widespread production and distribution network, its general availability and its utility as a feed stock in the steam reforming process. In virtual modeling of the system, iso-octane ($C_8H_{18}$) was the preferred embodiment hydrocarbon for providing heat energy (mixed with fuel cell off gas) and for providing the feed stock component for the steam reforming in the model base. Gasoline is a mixture comprising approximately 50 or more hydrocarbons, $C_XH_Y$; iso-octane $C_8H_Y$ is a surrogate used as a model in virtual process simulations.

The system is scalable to meet varying power requirements in which incremental design units are determined by the number of channels in the separate HEX (heat exchange, catalyst, reactor and processor) units as well as the number of HEX units. Channels in the units having a predetermined point to point separation are optimally designed to have a maximum depth allowing fluid flow to pass over a maximized surface area. For example, the length of a channel determines the residence time of a fluid increment and is in turn dependent on pressure change in the channel. In an example of a channel unit with a nominal channel gap of 250 microns+/−50 microns (allowing for the thickness of a catalyst coating) the channel separation to depth aspect ratio may be in the range from about 1:10 or 1:25 to 1:100, determined by design considerations, to maximize surface area and reaction efficiency as design parameters.

The system is an energy conversion unit with overall power production ranges extending from a few watts to megawatts scalable units of the systems are useful in robotics, laptop computers, micro electronic devices, automobile engines, hydrogen re-fueling stations and other mobile or fixed location applications where a discrete, as opposed to distributed, source of hydrogen is required by preference or necessity. The system is assembled from micro component devices that are modular and scalable through the use of small "units", based on laminar channel capacity that may be assembled incrementally to provide a predetermined source of maximum power. For example, four 25 kw units may be incrementally ganged to provide 100 kw and operated to provide a continuous 0-100 kw range and/or configured for optimum power needs such as a 50-75 kw range.

Fluid flows through the channels as a result of pressure differential is in the order of a differential pressure drop of less than 100 psi; laminar flow through the channels provides a low pressure drop in the system. Water, in the form of condensate from system exhaust, is introduced through a pump, as is the gasoline or hydrocarbon component introduced under pressure. Reaction balance in the system is achieved by variably adjusting pump and compressor pressures to maintain fluid flow such that reactions are balanced.

In addition to, or in combination with gasoline, methanol and ethanol may be used in the system. Methane is a gas and would not need to be vaporized. As noted, other hydrocarbon fuel sources such as methanol, ethanol, methane, ethane, propane, butane and other hydrocarbon fuels and mixtures thereof may be utilized as combustion sources or hydrogen gas precursors in cycles of the system adapted from the preferred embodiment in accordance with suitable stoiciometric variations that result in a balanced reaction cycle having the characteristics described herein. Certain of these hydrocarbons are stored as liquids, but may be introduced to the system as gases, in this instance, eliminating a need in the system for vaporizer components at cycle beginning stages.

Having described the invention in detail, those skilled in the art will appreciate that, given the present disclosure; modifications may be made to the invention without departing from the spirit of the inventive concept herein described. Rather, it is intended that the scope of the invention be determined by the appended claims.

The invention claimed is:

1. Apparatus for producing a syn-gas comprising:
 1) a hydrogen fuel cell having an outlet for off gas produced by the fuel cell;
 2) a source of vaporized hydrocarbons and water vapor fed to a mixer for producing a chemically balanced feed stock mixture of vaporized hydrocarbons and water vapor for introduction into a steam reformer,
 3) The steam reformer having (a) an inlet interconnected with the mixer from which the feed stock is introduced, and (b) a steam reformer outlet for the syn-gas produced therein, and
 4) a combustor interconnected to receive off gas from the off gas outlet of the fuel cell, the combustor operatively disposed in a heat exchange relationship with respect to the steam reformer such that the steam reformer is heated by the combustor, wherein:
 the steam reformer and combustor are enclosed within a steam reformer module, in which steam reformer module a single wavyplate extends between upper and lower interior surfaces of the module, forming a steam reformer side and a combustor side, the wavyplate dividing the module into separated longitudinally extending steam reformer and combustor micro channel flow paths alternating with, and adjacent to each other to maintain laminar fluid flow on each opposite side of the wavyplate, and, a) a surface of the steam reformer side of the wavyplate is coated with a catalytically active steam reforming material, and b) the combustor micro channel flow path is defined by the opposite side surface of the wavyplate; wherein heat generated in the combustor side is exchanged through the wavyplate during the flow of the feed stock through the steam reformer and the heat induces a reaction of the feed stock by the catalytically active steam reforming material to produce the syn-gas, wherein:

1) the mixer is interconnected with a vaporizer, and the vaporizer is interconnected to a hydrocarbon source and a water source providing to the mixer vaporized hydrocarbons and water vapor, the mixer producing the feed stock mixture of vaporized hydrocarbons and water vapor, 2) the vaporizer is disposed in a heat exchange relationship with respect to a second combustor via a single vaporizer wavyplate extending between upper and lower interior surfaces of a vaporizer module, the vaporizer wavyplate forming a vaporizer side and a second combustor side, and a) on a combustor side surface of the vaporizer wavyplate, the vaporizer wavyplate is coated with a catalytically active material to cause the off gas to combust in the second combustor, and b) opposite the combustor side surface is a vaporizer side surface of the vaporizer wavyplate, and heat energy generated in the second combustor heats the vaporizer to produce the vaporized hydrocarbons and water vapor, 3) the off gas outlet of the fuel cell is interconnected with the second combustor and produces heat that is transferred to the vaporizer through the vaporizer wavyplate, 4) the steam reformer outlet directs syn-gas produced in the steam reformer to a cooling and purification module heat exchanger wherein the syn-gas is cooled and purified, and 5) an outlet from the cooling and purification module directs the cooled and purified syn-gas into a fuel inlet of the hydrogen fuel cell.

2. The apparatus of claim 1 in which the steam reformer side of the steam reformer wavyplate comprises a surface coated with an endothermic steam reforming catalyst and the combustor side of the steam reformer wavyplate comprises a surface coated with an exothermic oxidation catalyst.

3. Apparatus in accordance with claim 1 wherein the steam reformer is a micro component adapted for scalable power requirements wherein fluid flow is configured in a pressure regulated gas flow circuit for maintaining laminar flow, and, in serially interconnected fluid flow modules, a) in the vaporizer module, the vaporized hydrocarbon is mixed with fuel cell off gas having a hydrogen component and the mixture is combusted in the second combustor to heat the vaporizer within the vaporizer module; b) in steam reformer module, vaporized hydrocarbons and water vapor are introduced from the vaporizer module into the steam reformer to produce the syn-gas, which is c) cooled and purified in the cooling and purification module; and the cooled and purified gas is introduced into the hydrogen fuel cell, the fuel cell having a hydrogen inlet interconnection with gas flow from the cooling and purification module, and off gas from the fuel cell is directed to the vaporizer module.

4. The apparatus of claim 1 in which the vaporizer side of the vaporizer wavyplate comprises a surface coated with an endothermic steam reforming catalyst and the combustor side of the vaporizer wavyplate comprises a surface coated with an exothermic oxidation catalyst.

5. The apparatus of claim 1 wherein the vaporizer module define a volume for each fluid flow through the vaporizer and the combustor and the vaporizer wavyplate comprises a folded divider having alternating crests and troughs forming channels on opposite sides thereof, the vaporizer wavyplate being disposed between upper and lower interior surfaces of the vaporizer module, wherein point to point separations of the crests and troughs disposed between the walls define fluid flow channels on the opposite sides of the vaporizer wavyplate.

6. The apparatus of claim 1 comprising a steam reforming system for the production of syn-gas including, in a serial interconnection, a) a heat exchange start module, b) a pre heater heat exchange module, and c) a heat exchange vaporizer module in advance of the steam reformer; d) a water gas shift reactor module, and e) a cooling and purification module for cooling the fluid flow of gas from the steam reformer disposed from the steam reformer, wherein the water gas shift reactor is in an in-line serial interconnection from the steam reformer defining an uninterrupted fluid flow path from the start module to a gas inlet of the hydrogen fuel cell.

7. Apparatus of claim 6 wherein each of the start module, pre heater, vaporizer, heat exchanger and the water gas shift reactor are defined by a corresponding module comprising two enclosed volumes defined by corresponding single wavyplates separating the two sides of the respective start module, pre heater, vaporizer, heat exchanger and the water gas shift reactor for fluid flow through each side of each module, each corresponding single wavyplate a) comprising a folded divider having alternating crests and troughs extending from each interior facing surface of a first wall and a second wall of each module to form separated channels for fluid flow therein on opposite sides thereof.

8. The apparatus of claim 6 further including a zeolite cracker disposed in a continuous fluid flow path between the vaporizer and the steam reformer.

9. Apparatus of claim 1 in which the micro channels have a width to depth aspect ratio of from about 1:10 to about 1:100 and the pressure of fluid flow through the channels is regulated to maintain laminar flow.

10. Apparatus of claim 6 wherein at least one side surface of at least one wavyplate includes a catalyst coating thereon selected from the group of at least one of platinum, palladium, cerium oxide, aluminum hydroxide and cuprous oxide.

11. Apparatus of claim 1 including a gasoline fuel source interconnected with the mixer wherein the gasoline is vaporized and fed to the mixer.

12. Apparatus of claim 6 including an oxidation reactor in a fluid flow path to receive flow from the steam reformer in advance of an inlet to the hydrogen fuel cell.

* * * * *